United States Patent
Proefrock et al.

(10) Patent No.: US 9,287,702 B2
(45) Date of Patent: Mar. 15, 2016

(54) UNIVERSAL POWER INTERFACE

(71) Applicant: INTEL CORPORATION, Santa Clara, CA (US)

(72) Inventors: Wayne L. Proefrock, Hillsboro, OR (US); Lilly Huang, Portland, OR (US); Krishnan Ravichandran, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 566 days.

(21) Appl. No.: 13/728,268

(22) Filed: Dec. 27, 2012

(65) Prior Publication Data

US 2014/0183974 A1    Jul. 3, 2014

(51) Int. Cl.
| | |
|---|---|
| *H01H 47/00* | (2006.01) |
| *H02J 1/06* | (2006.01) |
| *G06F 1/26* | (2006.01) |
| *H02J 7/35* | (2006.01) |
| *H02J 7/00* | (2006.01) |

(52) U.S. Cl.
CPC . *H02J 1/06* (2013.01); *G06F 1/266* (2013.01); *H02J 7/35* (2013.01); *G06F 2213/0042* (2013.01); *H02J 2007/0062* (2013.01); *Y10T 307/747* (2015.04); *Y10T 307/858* (2015.04)

(58) Field of Classification Search
USPC .............................................. 307/113, 130
See application file for complete search history.

(56) References Cited

U.S. PATENT DOCUMENTS

| | | |
|---|---|---|
| 5,548,200 A | 8/1996 | Nor et al. |
| 5,640,076 A | 6/1997 | Youn ................................ 320/2 |
| 6,222,370 B1 | 4/2001 | Shousek et al. |
| 6,271,643 B1 | 8/2001 | Becker et al. |
| 6,392,384 B1 | 5/2002 | Hwang Bo et al. |
| 6,448,742 B1 | 9/2002 | Waterman et al. |
| 7,023,180 B2 | 4/2006 | Nagai et al. .................... 320/162 |
| 7,030,517 B2 | 4/2006 | Hansmann et al. ........... 307/150 |
| 7,425,815 B2 | 9/2008 | Wong et al. .................... 320/141 |
| 7,432,685 B2 | 10/2008 | Hayashi ......................... 320/128 |
| 7,446,434 B1 | 11/2008 | Simmons et al. |
| 7,498,769 B1 | 3/2009 | Potanin et al. |
| 7,514,900 B2 | 4/2009 | Sander et al. .................. 320/101 |
| 7,535,122 B2 | 5/2009 | Visairo-Cruz et al. |
| 7,560,829 B2 | 7/2009 | Proefrock et al. .............. 307/18 |
| 7,573,235 B2 | 8/2009 | Hand |

(Continued)

FOREIGN PATENT DOCUMENTS

| | | |
|---|---|---|
| JP | 2002-084756 | 3/2002 |
| JP | 2005-117768 | 4/2005 |

(Continued)

OTHER PUBLICATIONS

International Search Report and Written Opinion for PCT/US2013/060394 dated Dec. 27, 2013.

(Continued)

*Primary Examiner* — Danny Nguyen
(74) *Attorney, Agent, or Firm* — KED & Associates LLP

(57) ABSTRACT

An electronic device is provided that may include an input port to couple to an external device, and a universal power interface to determine a type of the external device connected to the input port based at least on a voltage of a voltage supply line. The universal power interface may provide a power delivery path based on the determined type of the external device.

12 Claims, 5 Drawing Sheets

(56) References Cited

U.S. PATENT DOCUMENTS

| | | | |
|---|---|---|---|
| 7,615,965 B2 | 11/2009 | Popescu-Stanesti et al. | 320/128 |
| 7,622,898 B2 | 11/2009 | Shimizu et al. | 320/166 |
| 7,698,575 B2 | 4/2010 | Samson | |
| 7,759,906 B2 | 7/2010 | Ferguson | 320/164 |
| 7,790,307 B2 | 9/2010 | Kim | 429/122 |
| 7,870,916 B2 | 1/2011 | Carter | |
| 7,893,657 B2 | 2/2011 | Chavakula | 320/138 |
| 8,120,312 B2 | 2/2012 | Bucur et al. | |
| 8,174,313 B2 | 5/2012 | Vice | |
| 8,242,742 B2 | 8/2012 | Kao et al. | |
| 8,339,105 B2 | 12/2012 | Maleyran et al. | 320/138 |
| 8,368,345 B2 | 2/2013 | Wahlqist et al. | 320/101 |
| 8,400,162 B1 | 3/2013 | Jannson et al. | |
| 8,450,980 B2 | 5/2013 | Kumar et al. | 320/138 |
| 8,482,260 B2 | 7/2013 | Hsieh et al. | 320/138 |
| 8,581,550 B2 | 11/2013 | Lin et al. | 320/123 |
| 8,587,251 B2 | 11/2013 | Nakashima et al. | 320/101 |
| 8,773,077 B1 | 7/2014 | Elmes et al. | |
| 8,903,456 B2 | 12/2014 | Chu et al. | |
| 2001/0034807 A1* | 10/2001 | Takaoka et al. | 710/131 |
| 2003/0057920 A1 | 3/2003 | Dotzler | |
| 2005/0141154 A1 | 6/2005 | Consadori et al. | |
| 2006/0256989 A1 | 11/2006 | Olsen et al. | |
| 2009/0128086 A1 | 5/2009 | Lee | |
| 2009/0212222 A1 | 8/2009 | Kito et al. | 250/361 R |
| 2011/0029703 A1* | 2/2011 | Huo et al. | 710/110 |
| 2011/0062913 A1 | 3/2011 | Lin et al. | 320/101 |
| 2011/0109261 A1 | 5/2011 | Chavakula | 320/101 |
| 2011/0133700 A1 | 6/2011 | Martin et al. | |
| 2011/0138197 A1 | 6/2011 | Lakshmanan et al. | |
| 2012/0021807 A1 | 1/2012 | Book et al. | |
| 2012/0091968 A1 | 4/2012 | Heo et al. | 320/138 |
| 2012/0098350 A1 | 4/2012 | Campanella et al. | |
| 2012/0176078 A1 | 7/2012 | English et al. | |
| 2012/0187897 A1 | 7/2012 | Lenk et al. | 320/101 |
| 2012/0197341 A1 | 8/2012 | Cowley et al. | |
| 2012/0280648 A1 | 11/2012 | Hwang et al. | 320/108 |
| 2013/0290743 A1 | 10/2013 | Lee et al. | 713/300 |
| 2014/0001849 A1 | 1/2014 | Huang et al. | |
| 2014/0056041 A1 | 2/2014 | Zhu et al. | |
| 2014/0062395 A1 | 3/2014 | Kwon et al. | |
| 2014/0184160 A1 | 7/2014 | Huang et al. | 320/114 |

FOREIGN PATENT DOCUMENTS

| | | |
|---|---|---|
| JP | 2005-215983 | 8/2005 |
| KR | 14-2007-0109569 | 11/2007 |
| KR | 10-1170079 | 7/2012 |
| TW | 200739330 A | 10/2007 |
| WO | 2014/105235 A1 | 7/2014 |

OTHER PUBLICATIONS

International Search Report and Written Opinion for PCT/US2013/061723 dated Jan. 21, 2014.
U.S. Office Action for U.S. Appl. No. 13/730,561 dated Feb. 9, 2015.
U.S. Office Action for U.S. Appl. No. 13/538,265 dated Mar. 5, 2015.
U.S. Appl. No. 13/538,265, filed Jun. 29, 2012, Huang et al.
U.S. Appl. No. 13/730,561, filed Dec. 28, 2012, Huang et al.
U.S. Appl. No. 13/728,227, filed Dec. 27, 2012, Huang et al.
U.S. Office Action issued in co-pending U.S. Appl. No. 13/538,265 dated Sep. 22, 2014.
U.S. Office Action issued in co-pending U.S. Appl. No. 13/728,227 dated Dec. 18, 2014.
U.S. Notice of Allowance for U.S. Appl. No. 13/730,561 dated Jul. 22, 2015.
English translation of Taiwanese Search Report for Application 102147745 dated Aug. 25, 2015.

* cited by examiner

UNIVERSAL POWER INTERFACE

BACKGROUND

Field

Embodiments may relate to a universal power interface.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
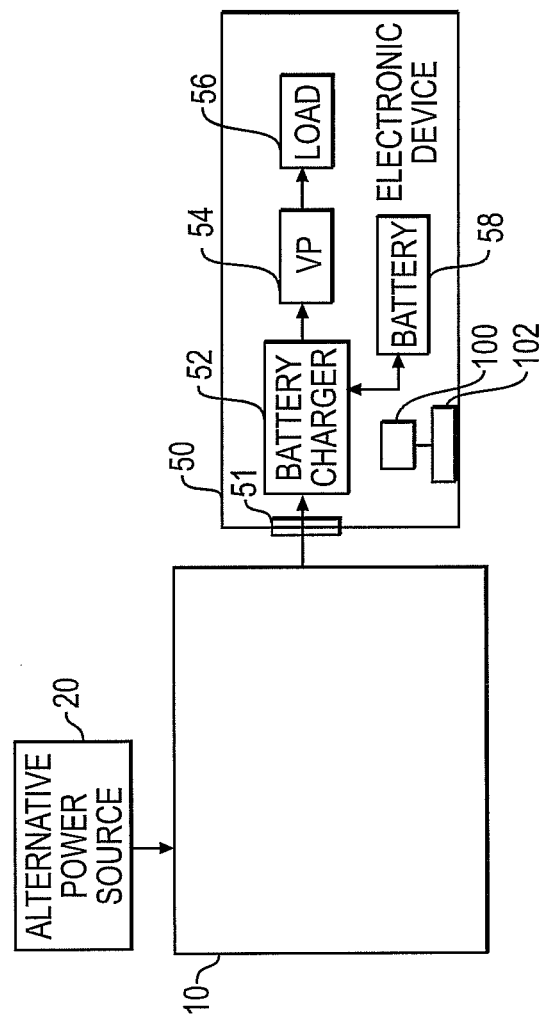
FIG. 1 is a diagram of an electronic device to receive power from an alternative power source according to an example embodiment.

In the following detailed description, like numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

An electronic device (or mobile device) may utilize an alternative power source (or a harvested energy) in order to power the electronic device. However, the alternative power source (or harvested energy) may be an unstable voltage supply. That is, an output voltage from a harvester (or other device) may vary widely. For example, the output voltage of a solar panel may range from a zero voltage to a large open circuit voltage.

A voltage supply with such a wide voltage variation may not be directly applied to a mobile device (or any other electronic device) since the device may be designed to operate based on a stable (or regulated) voltage supply. In order to maintain a constant voltage supply, a voltage regulator (VR) may be utilized. For example, a direct current/direct current (DC/DC) voltage regulator may be provided in a power delivery path in order to stabilize the output voltage. However, the DC/DC regulator inserted in the power delivery path may be at a high cost and result in power loss or low efficiency in power delivery.

There are many different types of connectors for AC/DC adaptor power inputs. The physical structure as well as electrical specifications of AC/DC adaptor power connectors may vary among manufacturers and even among different systems in products from the same manufacturer. This may result in inconvenience and incompatibility for an end user since the user may have to carry around a different AC/DC adaptor for each mobile device. There may also be an environmental impact and material wastage related to the manufacture and disposal of these connectors and/or adaptors. This problem may become even more compelling as many alternative energy sources (e.g. solar, fuel cells, and wind power) are emerging and becoming useful to electronic devices, which may further increase a number of connectors/interfaces with different types/sizes on electronic devices, such as mobile devices.

Some arrangements may include an in-between adapter connector console (i.e., an in-one multiple-connector interface) or possibly a connector-less energy transfers (e.g. wireless charging). However, these arrangements may have drawbacks. An intermediate console may increase a cost to the user and may add bulk to the system. Wireless charging may add cost and may have low energy transfer efficiency.

Another arrangement may be a universal serial bus (USB) Power Connector to create a communication link between a power supply (i.e., a provider) and a system (i.e., a consumer). The system may be an electronic device such as a laptop, a display or a mobile device, for example. The USB Power Connector may introduce a power interface that is physically compatible to legacy or common USB connectors. The USB Power Connector may allow power delivery of up to ~100 W (e.g. 5 A @ 20V), for example. However, the arrangement may require communication hardware logic and control messaging on both sides, namely a provider and a consumer. This may require some sort of intelligence and/or a certain type of transceiver integrated circuit (IC) required on every energy source or power supply, when the source is connected to the USB port. The USB Power Connector may add cost to the power supply. Additionally, the Universal Power Connector may be over-kill for "dumb" power sources such as a solar energy harvester, or a hand crank energy harvester.

Another approach to supply energy to electronic devices (such as mobile devices) is via a USB Battery Charger. The USB Battery Charger may be used in a portable device such as mobile devices (i.e., a smartphone). The USB Battery Charger may support an operation mode of bi-directional power flow called USB-OTG (i.e., provider/consumer exchangeable). It may have a low power limit (<~10 W, for example). Such a connector interface may also use a dedicated identification (ID) pin and/or data line D+/D− in order to distinguish between a DC power supply and data device. A supply voltage VBUS may be 5V±~5%, for example. These may not be applicable to devices that require a supply input of 12V to 19V with an AC/DC adaptor (i.e., the variation depending on battery configuration). This may also not be compatible with alternative power sources (ex: Solar or Hand Crank) due to the narrow voltage range (~100 mV vs. ~10V, for example).

Designs may require extra circuitry and/or communication intelligence on a power source (i.e., the provider side), may not be suitable or even applicable for a general application, especially for enabling alternative power sources (i.e., harvested energy sources).

FIG. 1 shows an electronic device to receive power from an alternative power source according to an example arrangement. Other arrangements may also be provided.

More specifically, FIG. 1 shows a charging system 10 to charge an electronic device 50 by using an alternative power source 20 (or alternative energy source). The charging system 10 is shown in FIG. 1 as being external to the electronic device 50. However, the charging system 10 may be part of the electronic device 50.

The electronic device 50 may be any one of a mobile terminal, a mobile device, a mobile computing platform, a mobile platform, a laptop computer, a tablet, an ultra-mobile personal computer, a mobile Internet device, a smartphone, a personal digital assistant, a display device, a television (TV), etc.

The alternative power source 20 may be any one of a solar energy source, a mechanical energy source (such as via wind), a photovoltaic energy source, a thermal energy source, a radio frequency (RF) energy source, a vibration energy source, a biomechanical energy source, a fuel cell and/or any other power source. Other alternative power sources may also be used.

The alternative power source 20 may provide power (or energy) to the charging system 10. The charging system 10 may dynamically tune an output impedance of the connected power source (or energy source) so that output power of the power source is optimal and/or a maximum available power (from a harvester) is outputted and delivered to a load.

The charging system 10 may include a voltage regulator to provide a regulator output voltage to the electronic device 50.

The electronic device 50 may include a power input port 51 to receive an input voltage (or power) from the charging system 10. A battery charger 51 may receive the input power. The battery charger 52 may provide an output voltage to a voltage regulator 54. The voltage regulator 54 (of the electronic device 50) may provide an output voltage to a load 56. The voltage regulator 54 may provide a regulated output voltage for the load 56. As one example, the load 56 may be a display device.

The battery charger 52 may also (or alternatively) provide an output voltage to a battery 58 (provided at the electronic device 50). The battery 58 may be charged by the voltage received from the battery charger 52. The battery charger 52 may provide an output voltage to either the load 56 (via a voltage regulator 54) or the battery 58.

FIG. 1 shows the use of an alternative power source (or alternative energy source) being provided to the power input port 51 after passing through the charging system 10. However, power may alternatively be provided directly to the USB input port 102 and may then be provided to a universal power interface 100 (or power interface).

The universal power interface 100 may include a physical connector and a steering/impedance matching circuitry that is provided on the electronic device 50 behind the input port, such as the USB input port 102. The USB input port 102 may hereafter be described as the physical connector of choice; however, embodiments may be provided to any interface that has a minimum of power (PWR) and ground (GND) pins. With the universal power interface 100 being based on the USB input port 102, a user may attach a power source or a USB device (e.g. a mouse, a keyboard) to the USB input port 102 and the system may detect and automatically perform the appropriate action. An attached power source may not be required to identify itself or communicate any message to the platform (i.e., the mobile device platform). A dumb power source that provides a supply voltage at the voltage supply VBUS to ground GND may be sufficient, and may be recognized by the host device (i.e., the consumer) as a power source. The energy may then be extracted and used by the host. The circuitry and associated control logic may be provided on a motherboard to enable this solution. The circuitry and associated control logic may integrate into a system on chip (SOC) or another existing integrated circuit (IC) on the platform for overall cost and savings.

Control logic may seamlessly direct or route the external power supply to the corresponding inputs on the electronic device 50 or voltage supply from a host platform to a USB device (external to the electronic device 50). This may be achieved without any additional requirements on an external power source.

Regardless of the type of sources or devices connected to the electronic device platform, data on the data (D+/D−) lines may always pass through without any further processing. The voltage supply VBUS line may be detected, analyzed and directed through a different power path based on a type of an input, power source or device, then property or characteristic of power source.

Figure 2:
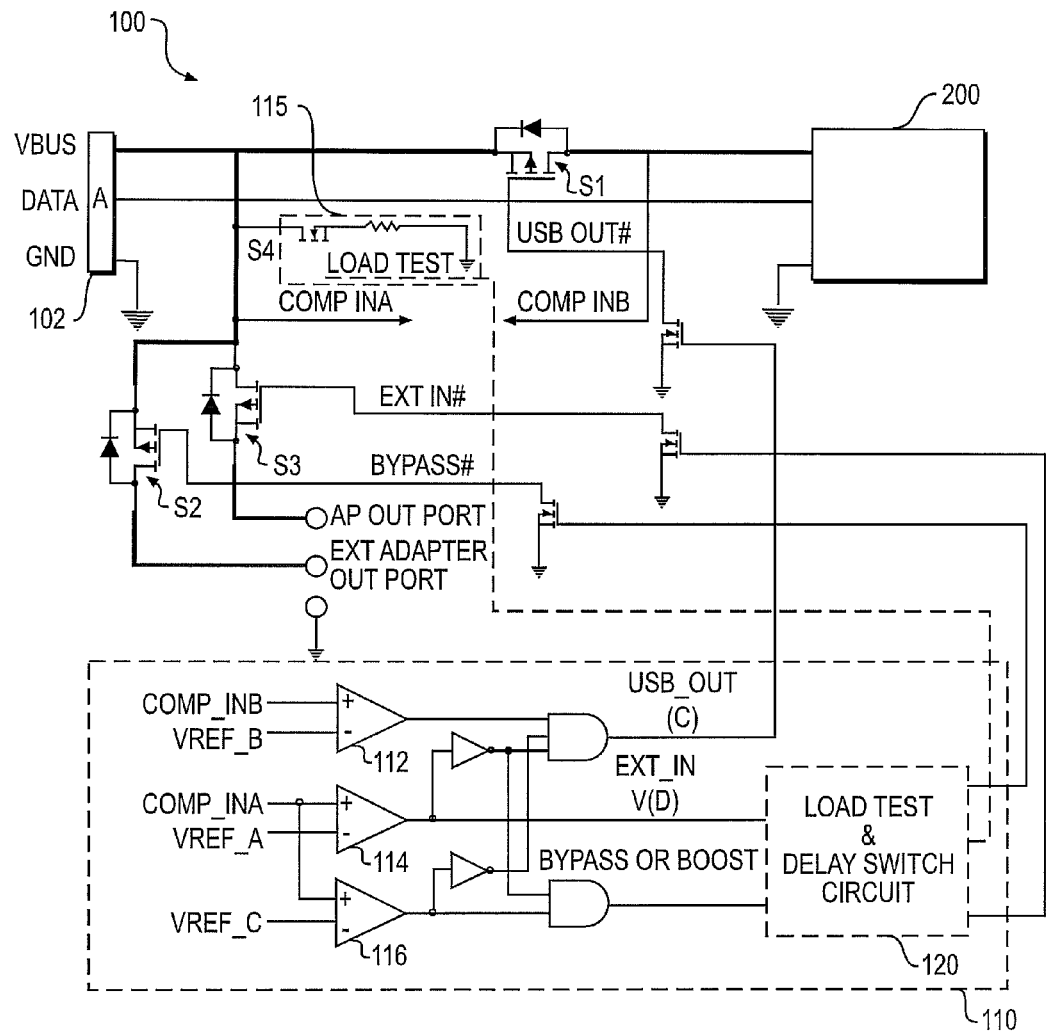
FIG. 2 is a circuit diagram of a universal power interface according to an example embodiment.

FIG. 2 shows a universal power interface according to an example embodiment. Other embodiments and configurations may also be used.

More specifically, FIG. 2 shows a universal power interface 100 that is provided between the USB input port 102 and a platform 200, such as a notebook platform, and electronic device platform or a mobile device platform, for example. Other platforms may also be utilized.

The universal power interface 100 may determine whether an external device connected to the USB input port 102 is a slave device (i.e., a device not producing power), a stable power source (such as a power supply), and/or an alternative power source. The universal power interface 100 may determine a type of the external device. Based on the determination, the universal power interface 100 may direct power to an appropriate component within the electronic device 50. A power delivery path may be determined based on the determined type of the electronic device 50.

Figure 3:
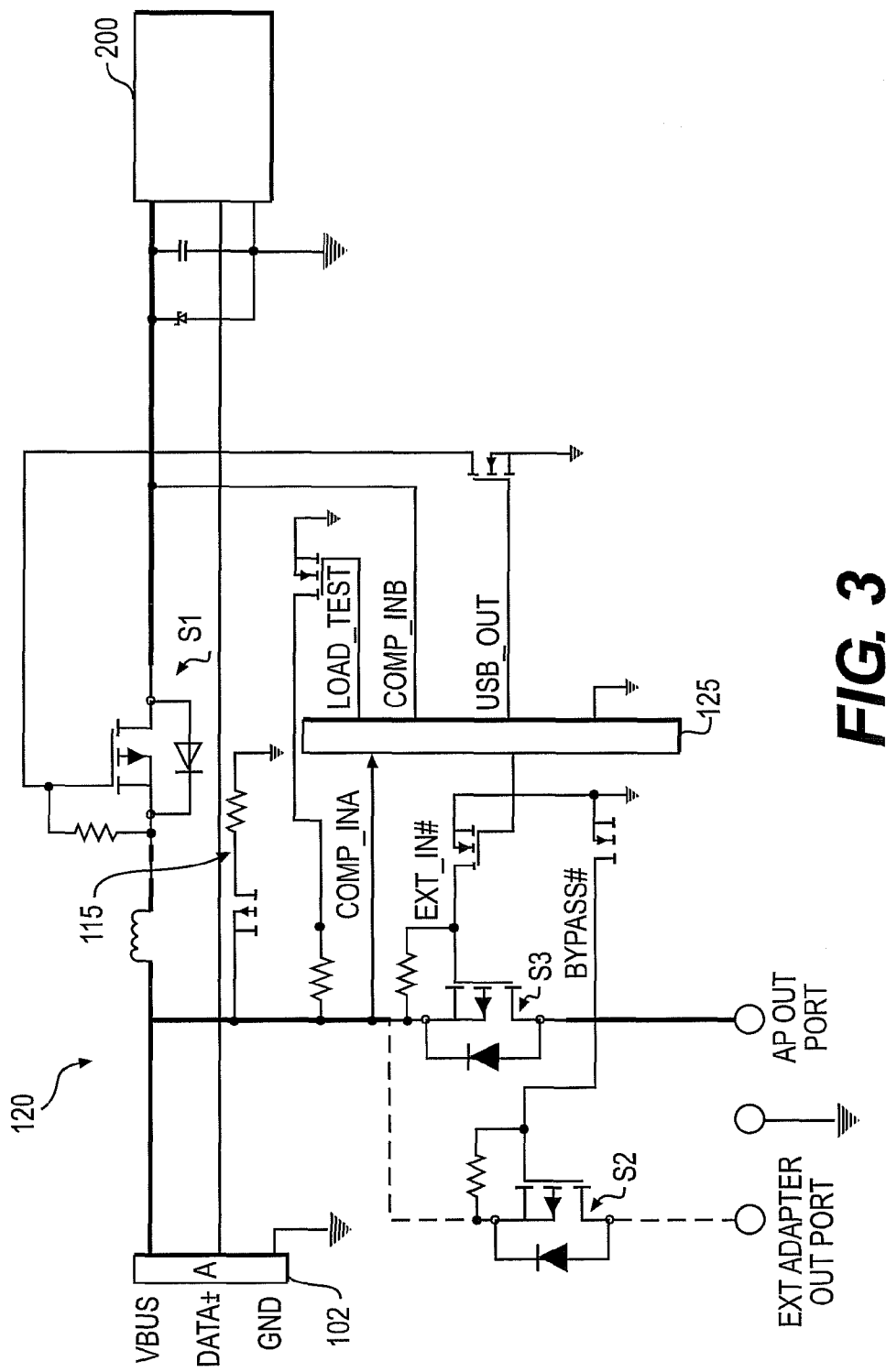
FIG. 3 is a circuit diagram of a universal power interface according to an example embodiment.
Figure 5:
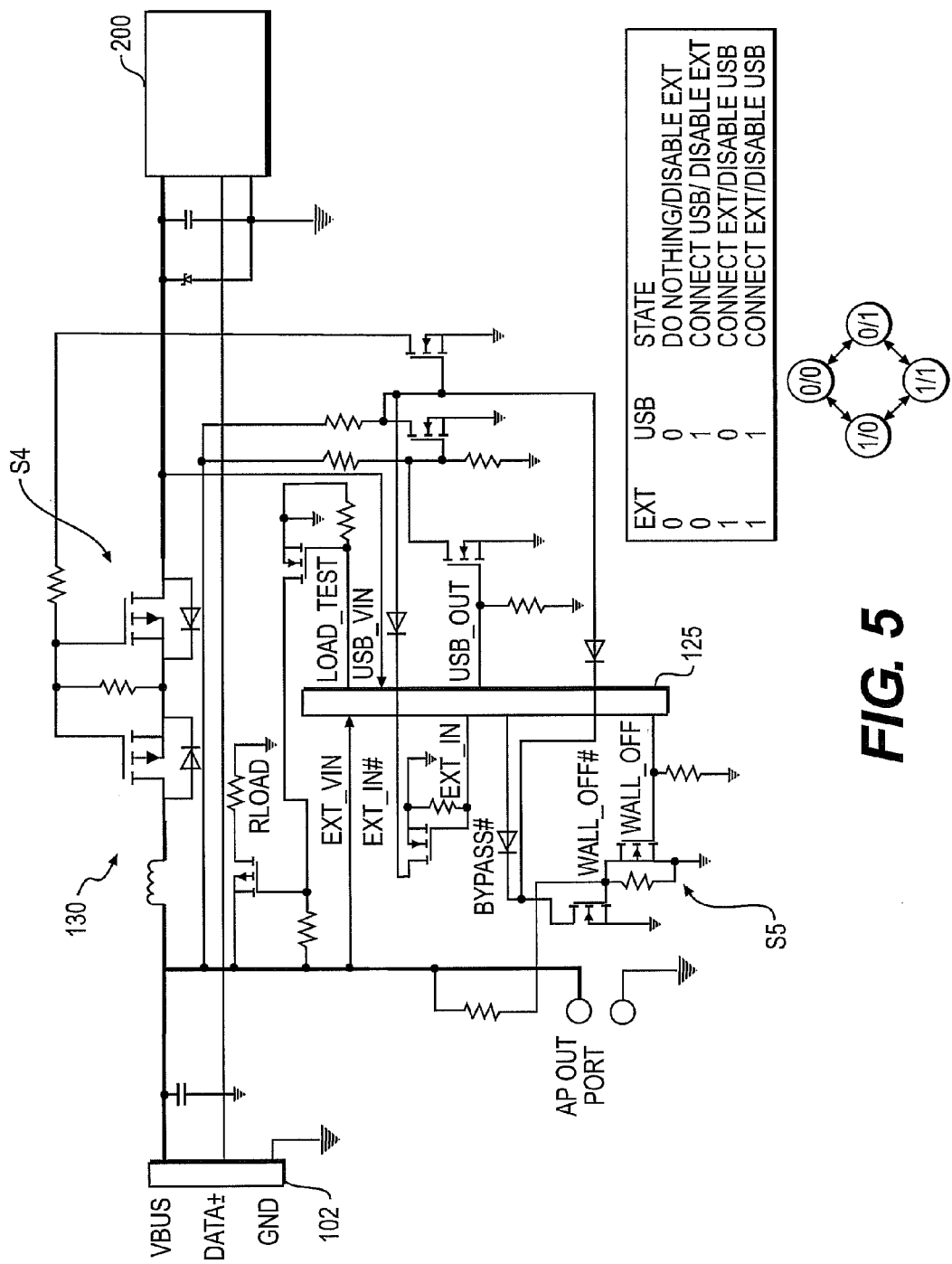
FIG. 5 is a circuit diagram of a universal power interface according to an example embodiment.

The determination of the type of external device may be made based on a determination circuit 110. The determination circuit 110 may be any of a number of different determination circuits, either analog or digital. For example, FIG. 2 shows an analog determination circuit used to determine a type of the external device connected to the USB input port 102. FIGS. 3 and 5 show a digital determination circuit used to determine a type of the external device connected to the USB input port 102. The determinations may be based at least in part on whether any power is being provided from the USB input port 102 and/or whether any input power is stable. Other types of determinations may also be made.

If the external device coupled to the USB input port 102 is determined (by the determination circuit) to be a stable power source, then the power of the external device may be provide to an Ext Adapter Out port (or node). This port may then provide the steady power to the appropriate components, such as a battery charger and/or a load.

As another example, if the external device is determined (by the determination device) to be an alternative power source (due to being non-stable), then the power may be provided to an AP Out port (or node). The AP Out port may be coupled to internal components to analyze and adjust characteristics of the received power, so as to provide a steady power supply to components of the platform 200. For example, after receiving the power from the external device (determined to be non-stable), the internal circuitry may adjust an impedance of the received power. In at least one embodiment, this may be based on a specific alternative power source that is determined to be in use.

The USB input port 102 includes the voltage supply VBUS line, data lines and ground. Other outputs and/or pins may also be provided.

The universal power interface 100 includes a switch S1 that is coupled to the voltage supply VBUS line. The switch S1 may be used to provide power from the USB host (or the platform 200) to be provided to the external device.

The universal power interface 100 may also include a switch S2 that is turned on (based on a BYPASS signal from the determination circuit 110). When the switch S2 is turned on, the power from the external device (connected to the USB input port 102) is provided to the Ex Adaptor Out port, which is then provided to the appropriate components within the electronic device 50, such as a battery charger or load on the platform 200.

The universal power interface 100 may also include a switch S3 that is turned on (based on an EXT_IN signal from the determination circuit 110). When the switch S3 is turned on, the power from the external device (connected to the USB input port 102) is provided to the AP Out port, which may then be provided to the appropriate components to adjust characteristics of the received power and to provide a steady power to components on the platform 200.

FIG. 2 shows one example of the determination circuit 100. Other types of determination circuits may also be provided. As shown, the determination circuit 100 may include components such as comparators 112, 114, 116, inverters, logical gates and a load test and delay switch circuit 120. These components may receive input signals COMP_INB and COMP_INA from the voltage supply VBUS line and a Load_Test signal from a load test circuit 115. The components may then provide the respective output signals, namely the USB_OUT signal, the EXT_IN signal and the BYPASS signal. The determination of whether a received power is steady or not may be made by the load test and delay switch 120.

The USB_OUT signal may be provided to the switch S1, the EXT_IN signal may be provided to the switch S2 and the BYPASS signal may be provided to the switch S3.

If an external USB slave device is connected to the USB input port 102, then the voltage supply VBUS (on the external power in side) may be "floating" at first when a normal host USB power isn't enabled or the system isn't on due to its nature as a consumer (e.g. a computer mouse). The universal power interface 100, and more particularly the determination circuit 110, may detect there is not a voltage supply on the voltage supply VBUS line, and the determination circuit 110 may turn on the switch S1 by providing the USB_OUT signal. Power may already be on the source side of the switch S1 due to the forwarded biased diode, if host power is available. There may be a full USB output voltage (e.g. 5V supply from a provider) appearing at the USB input port 102 provided that the USB device is available or connected. The power supply from the platform 200 may charge or power-up the USB device. In this example, the remainder of switches may be OFF (i.e., not connected).

Another example is one in which an external power source is connected to the USB input port 102. In this example, the voltage supply VBUS line (on the external power in side) may be detected and depending on a voltage level and/or other characteristics, the power supply on the voltage supply VBUS line may be connected to a desired power path.

For example, if a fixed voltage of 12V-19V from an AC/DC adaptor is connected, the power may be recognized as an AC/DC adapter input. Therefore, the voltage supply VBUS may be routed to the Ext Adapter Out port by the determination circuit 110 providing the BYPASS signal to turn the switch S2 ON. The fixed voltage supply (versus a variable voltage/current source) may be determined by switching ON or OFF a resistive load (provided at the load test circuit 115) connected to the external power input and monitoring the corresponding readings for a voltage droop. FIG. 2 shows the load test circuit 115 includes a switch S4 and a resistor connected to the determination circuit 110. If an input is detected at the input port 102, then the load may be tested by the load test circuit 115 prior to choosing the voltage path to take by enabling the appropriate control signals after the test.

If an alternative power source is connected to the USB input port 102, then the voltage supply VBUS may be routed to AP_OUT port by the determination circuit 110 providing the EXT_IN signal to turn the switch S3 on. Steps may then be taken in order to determine a type of a source and power processing when necessary, before the voltage supply VBUS may be connected to a load or component to be powered. For example, if the alternative power source is a USB +5V power supply, then the power may be directly delivered to the platform when the electronic device 50 has a 1-S Battery pack (i.e., the switch S2 is ON based on the BYPASS signal). If the platform has a 2, 3, or 4-S Battery pack, then the USB +5V power supply may not be capable of directly charging the battery (>8.4V). Then, the voltage may have to be "boosted" up from the voltage supply VBUS before being connected to the platform 200.

In another example, the alternative power source may be one of several different types of energy harvesters, such as a solar panel. By utilizing the switch S4 (ON or OFF), the solar source may be identified due to PV characteristics (e.g. Voc, Isc). The power through the voltage supply VBUS may be tuned and the voltage may be regulated (e.g. power conditioning) before being connected to the platform supply input.

The above described detection & selection logic may determine the proper channel for normal USB slave device or a corresponding path for external power vs. alternative power inputs. The logic may be implemented in different mechanisms such as Boolean logic circuitry or look-up table or even microcontroller (firmware) in a more sophisticated way.

FIG. 3 shows a universal power interface according to an example embodiment. Other embodiments and configurations may also be used.

More specifically, FIG. 3 shows a universal power interface 120 that is provided between the USB input port 102 and the platform 200, such as a notebook platform or mobile device platform.

The universal power interface 120 (FIG. 3) may be similar to the universal power interface 100 (FIG. 2) other than a controller 125 (or microcontroller) that is provided rather than the determination circuit 110.

The controller 125 may receive input signals, such as the COMP_INA signal, the COMP_INB signal and the LOAD_TEST signal. The controller 125 may appropriately output signals, such as the USB_OUT signal, the BYPSASS signal, and the EXT_IN signal.

In a similar manner as discussed above with respect to FIG. 2, the USB_OUT signal may be provided to the switch S1, the BYPASS signal may be provided to the switch S2 and the EXT_IN signal may be provided to the switch S3.

The switch S1 may allow power to be provided from the host (or the platform 200) to the external device coupled to the USB input port 102. The switch S2, when turned ON, may provide power from the external device to the Ext Adapter Out port (or node). The switch S3, when turned ON, may provide power from the external device to the AP Out port (or node).

The controller 125 may receive voltage inputs from the voltage supply line VBUS and may provide an output signal to at least one of the plurality of switches based on the received voltage inputs.

Figure 4:
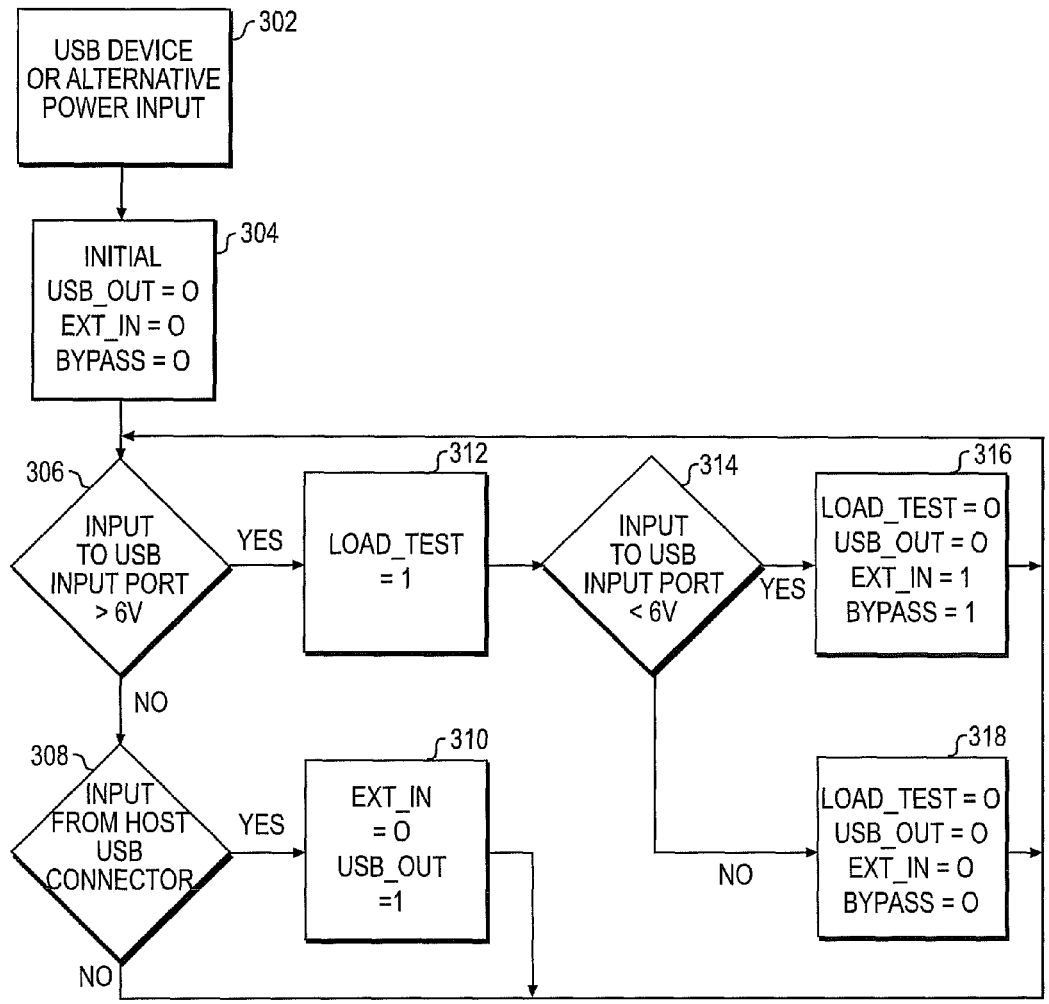
FIG. 4 is a flowchart showing operations of a universal power interface according to an example embodiment.

FIG. 4 is a flowchart showing operations of an electronic device using a universal power interface. Other operations and orders of operations may also be provided.

More specifically, FIG. 4 shows a flowchart relating to inputs and outputs of the controller 125 (FIG. 3). As stated above, the controller 125 may receive input signals and may appropriately output signals, such as the USB_OUT signal, the BYPSASS signal, and the EX_IN signal. The output signals may be provided to one of the switches S1, S2, S3.

In operation 302, a USB external device or an alternative power input may be provided to the USB input port. In operation 304, various values may be initialized, namely USB_OUT, EXT_IN and BYPASS may be all set to zero.

In operation 306, a determination may be made (such as by the controller 125) of whether the input to the USB input port is greater than 6 volts, for example. This level may be changed based on design since this 6 volt level was chosen to be above the USB 5 volts provided by the host. If the determination is NO, then a determination may be made in operation 308 of whether the input is from the host USB connector (or the platform 200).

If the determination in operation 308 is YES, then in operation 310, the values may change, such that EXT_IN=0 and USB_OUT=1. The operation may then return to operation 306. If the determination in operation 308 is NO, then the operation may return to operation 306.

If the determination in operation 306 is YES, then LOAD_TEST=1 in operation 312. Subsequently, a determination may be made in operation 314 regarding whether the input to the USB input port is less than 6 volts, for example.

If the determination in operation 314 is YES, then in operation 316, LOAD_TEST=0, USB_OUT=0, EXT_IN=1 and BYPASS=1. The operation may then return to operation 306.

If the determination in operation 314 is NO, then in operation 318, LOAD_TEST=0, USB_OUT=0, EXT_IN=0 and BYPASS=0. The operation may then return to operation 306.

The above description of the flowchart of FIG. 4 may correspond to operations performed with the controller 125, or other circuitry. The output signals may be generated and provided to the appropriate switches of FIG. 3.

FIG. 5 shows a universal power interface according to an example embodiment. Other embodiments and configurations may also be used.

More specifically, FIG. 5 shows a universal interface 130 that is provided between the USB input port 102 and the platform 200, such as a notebook platform or mobile device platform.

The universal power interface 130 (FIG. 5) is similar to the universal power interface 120 (FIG. 3) by including the controller 125 (or microcontroller). However, the FIG. 5 embodiment includes two switches S4 and S5, rather than three switches S1, S2, S3. In the FIG. 5 embodiment, the switch S4 may relate to the USB_OUT signal. The switch S4 may allow power to be provided from the platform 200 to the external device coupled to the USB input port 102. The switch S5 may relate to at least the BYPASS signal. The switch S5 may allow power to be provided to the AP OUT port that may then provide the power to the appropriate components within the electronic device.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
an input port to couple to an external device; and
a universal power interface that includes a plurality of switches, the universal power interface to:
determine a type of the external device coupled to the input port based at least on a voltage on a voltage supply line,
provide a power delivery path based on the determined type of the external device, wherein to provide the power delivery path includes:
provide power from a platform of the electronic device to the external device coupled to the input port, based on an operation of a first one of the switches, and
provide steady power from the external device to the platform of the electronic device, based on an operation of a second one of the switches.

2. The electronic device of claim 1, wherein the input port is a universal serial bus (USB) port.

3. The electronic device of claim 1, the universal power interface to:
provide power from the external device to components of the electronic device that adjusts at least one characteristic of the received power, based on an operation of a third one of the switches.

4. The electronic device of claim 1, wherein the universal power interface includes a determination circuit to receive at least one voltage input from the voltage supply line and the determination circuit to provide an output signal to at least one of the plurality of switches based on the received voltage input.

5. The electronic device of claim 1, wherein the universal power interface includes a controller to receive voltage inputs from the voltage supply line and to provide an output signal to at least one of the plurality of switches based on the received voltage inputs.

6. An electronic device comprising:
a load;
an input port to couple to an external device; and
a universal power interface to alter a power delivery path based at least in part on a voltage on a voltage supply line between the input port and the load, wherein the universal power interface includes a plurality of switches,
the universal power interface to provide power from the load of the electronic device to the external device coupled to the input port, based on an operation of a first one of the switches; and
the universal power interface to provide steady power from the external device to the load of the electronic device, based on an operation of a second one of the switches.

7. The electronic device of claim 6, wherein the input port is a universal serial bus (USB) port.

8. The electronic device of claim 6, the universal power interface to provide power from the external device to components of the electronic device that adjusts at least one characteristic of the received power, based on an operation of a third one of the switches.

9. The electronic device of claim 6, wherein the universal power interface includes a determination circuit to receive voltage inputs from the voltage supply line and to provide an output signal to at least one of the plurality of switches based on the received voltage input.

10. The electronic device of claim 6, wherein the universal power interface includes a controller to receive voltage inputs from the voltage supply line and to provide an output signal to at least one of the plurality of switches based on the received voltage inputs.

11. A method of using an electronic device comprising:
receiving at least two voltages from a voltage supply line between an external device and a host platform;
determining a type of the external device based on the received voltages; and
changing a power delivery path between the external device and the host platform based on the determined type of the external device,
wherein changing the power delivery path includes operating a first switch to provide power from the host platform to the external device, and
wherein changing the power path delivery further includes operating a second switch to provide steady power to the host platform of the electronic device.

12. The method of claim 11, wherein changing the power path delivery further includes operating a third switch to provide power from the external device to components of the electronic device to adjust at least one characteristic of the received power.

\* \* \* \* \*